(12) United States Patent
Abrishamchian et al.

(10) Patent No.: US 7,489,472 B2
(45) Date of Patent: Feb. 10, 2009

(54) HIGH-ORDER HYBRID ACTUATOR CONTROLLER

(75) Inventors: Mirmehdi L. Abrishamchian, Shrewsbury, MA (US); Travis Hein, Holliston, MA (US); Jihao Luo, Shrewsbury, MA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 11/657,161

(22) Filed: Jan. 24, 2007

(65) Prior Publication Data

US 2008/0174900 A1 Jul. 24, 2008

(51) Int. Cl.
*G11B 5/596* (2006.01)

(52) U.S. Cl. ................. 360/78.09; 360/78.04

(58) Field of Classification Search ........ None
See application file for complete search history.

(56) References Cited

U.S. PATENT DOCUMENTS

| | | | |
|---|---|---|---|
| 5,608,586 A * | 3/1997 | Sri-Jayantha et al. .... | 360/77.04 |
| 5,739,972 A | 4/1998 | Smith et al. .............. | 360/77.03 |
| 5,867,342 A * | 2/1999 | Hattori .................... | 360/77.08 |
| 5,872,676 A | 2/1999 | Smith et al. .............. | 360/77.03 |
| 5,880,901 A | 3/1999 | Smith et al. .............. | 360/77.03 |
| 6,002,539 A | 12/1999 | Smith et al. .................... | 360/65 |
| 6,084,754 A | 7/2000 | Smith et al. ................. | 360/135 |
| 6,154,335 A | 11/2000 | Smith et al. .................... | 360/75 |
| 6,384,994 B1 | 5/2002 | Smith et al. .................... | 360/25 |
| 2006/0072238 A1 * | 4/2006 | Hensen .................... | 360/78.06 |

* cited by examiner

Primary Examiner—Jason C Olson
(74) Attorney, Agent, or Firm—Westman, Champlin & Kelly, P.A.

(57) ABSTRACT

A method of providing a control output by selecting a controller to an actuator is discussed. A first controller having an estimator-compensator architecture is selected if the actuator is in a settle stage. A second controller having an architecture other than that of the first controller is selected when the actuator is in a track follow stage. The control output is provided from the selected controller to the actuator. The control output is indicative of the control signal.

19 Claims, 6 Drawing Sheets

HIGH-ORDER HYBRID ACTUATOR CONTROLLER

FIELD OF THE DISCLOSURE

The present disclosure relates generally to control systems, and more particularly but not by limitation, to actuator controllers such as those used for data storage systems.

BACKGROUND

Data storage systems including data storage media such as disc drives are commonly used in a wide variety of devices to store large amounts of data in a form that can be made readily available to a user. While commonly used in computing devices such as personal computers, workstations, and laptops, disc drives have also been incorporated into personal music devices and in other applications.

In general, a disc drive includes one or more storage discs that are rotated by a spindle motor. The surface of each of the one or more storage discs is divided into a series of data tracks. The data tracks are spaced radially from one another across a band having an inner diameter and an outer diameter. The data tracks extend generally circumferentially around the disc and can store data in the form of magnetic transitions within the radial extent of a given track. An interactive element, such as a magnetic transducer, is used to sense the magnetic transitions to read data from the given track. In addition, the interactive element can transmit an electric signal that causes a magnetic transition on the disc surface to write data to the given track.

The interactive element is mounted to an arm of an actuator. The interactive element is then selectively positioned by the actuator arm over a given data track of the disc to either read data from or write data to the given data track of the disc, as the disc rotates adjacent the transducer. The actuator arm is, in turn, mounted to a voice coil motor that can be controlled to move the actuator arm relative to the disc surface.

An embedded servo control system is typically used to control the position of the actuator arm to ensure that the interactive element is properly centered over the given data track during either a read or write operation. In the embedded servo control system, servo position information can be recorded on the disc surface between written data blocks, and periodically read by the interactive element for use in a closed loop control of the voice coil motor to position the actuator arm. Alternatively, dedicated servo tracks or surfaces can be used.

In modern disc drive architectures utilizing embedded servo control systems, each data track is divided into a number of data sectors for storing fixed size data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors. The servo sectors can be read to determine the position of the interactive element relative to the disc drive surface for the purposes of reading data from the given data track.

The process of moving the actuator arm from one position to another is divided into a number of stages, including a seek stage, a settle stage, and a track following stage. The settle stage can be further divided into an early settle stage and a late settle stage. Each stage has different performance requirements and thus requires different capabilities from the embedded servo control system. Examples of the performance requirements that must be met by the overall design include reducing seek time and post seek oscillation, reducing the effects of operational vibration, reducing steady state tracking error, improving acoustics, and reducing power consumption and processing overhead. In addition, smooth transitions between the different stages of the embedded servo control system will ensure adequate performance m high performance disc drives by reducing transient signals that may occur during transitions. For example, any transients generated during a transition between one stage and another stage can degrade the performance of the disc drive. In addition, controller designs that incorporate the same architecture from one stage to the next can impose constraints on the performance of the controller architecture from one stage to another.

SUMMARY

In one illustrative embodiment, a method of selecting a controller is discussed. If the actuator is in a settle stage, a first controller having an estimator-compensator architecture is selected. If the actuator state is in a track follow stage, a second controller having an architecture other than that of the first controller is selected. The method further includes providing a control output from the selected controller to the actuator. The control output is indicative of the control signal.

In another illustrative embodiment, another method is discussed. The method includes a step of providing an output signal from a first controller to an actuator. The first controller has an estimator-compensator architecture. The method further includes a step of receiving a control signal indicative of a desired position of the actuator. A feedback signal indicative of an actual position of the actuator is also received. In addition, the method further includes, responsive to the control signal and the feedback signal, transitioning from the first controller to a second controller so that the output signal is provided by the second controller. The second controller has an architecture other than the estimator-compensator architecture.

In still another illustrative embodiment, an apparatus is discussed. The apparatus includes an actuator and an actuator controller. The actuator controller is operably coupled to the actuator. The actuator controller has an architecture including a first controller having an estimator-compensator architecture and a second controller having an architecture other than an estimator-compensator. The actuator controller is configured to select one of the first and second controllers to provide an output to the actuator.

These and other features and benefits that characterize embodiments of the present invention will be apparent upon reading the following detailed description and review of the associated drawings.

DETAILED DESCRIPTION

Embodiments of the present invention will be discussed with reference to a magnetic disc drive. One skilled in the art will recognize that the present invention may also be applied to any data storage device, such as an optical disc drive, a magneto-optical disc drive, or other data storage device having one or more heads for accessing data on one or more storage media devices. The present invention may also be applied to non-data storage applications, such as those having a controller that controls the position of an actuator.

Figure 1:
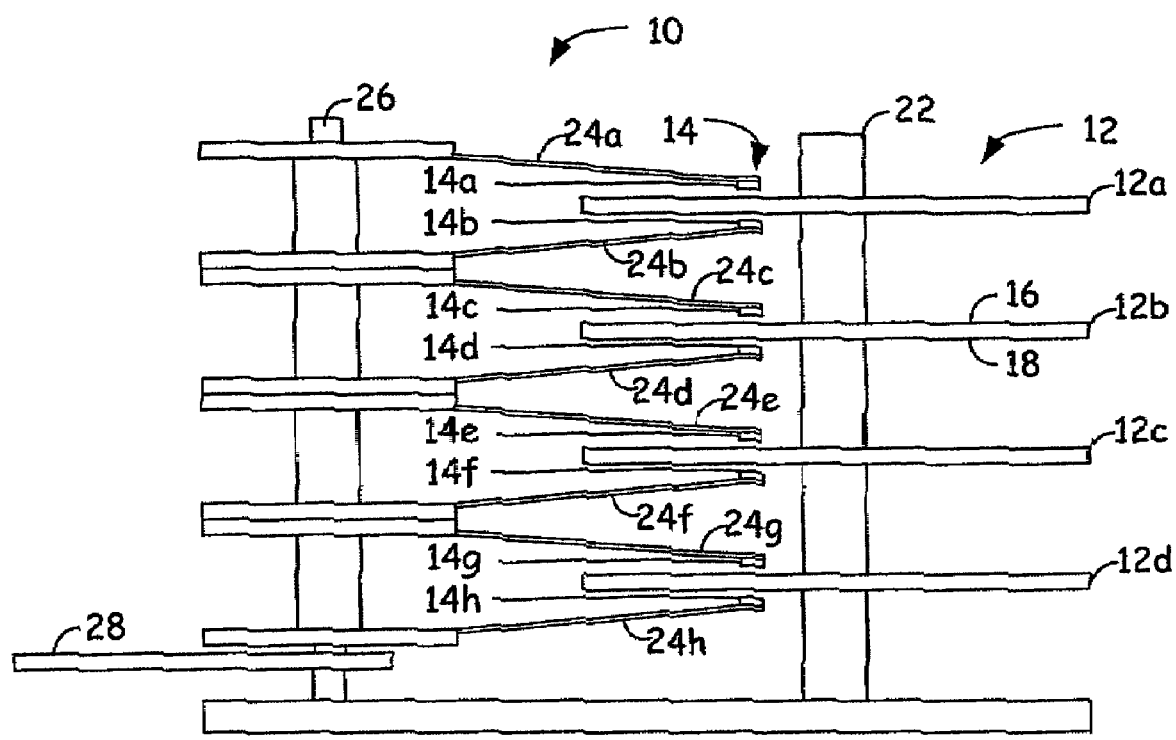
FIG. 1 is a side elevation view of an exemplary schematic diagram of a disc drive system of the type that the controllers of the current discussion can be usefully employed.

FIG. 1 provides a schematic diagram of an examplary disc drive system 10. The disc drive system 10 includes a stack of data storage discs 12a-d (collectively data storage discs 12) and a stack of interactive elements 14 (individually 14a-h), which, in the illustrated example, are transducers, such as read and/or write heads. Each of the storage discs 12a-d has a first surface 16 and a second surface 18, which opposes the first surface 16. Each of the first and second surfaces 16 and 18 includes a plurality of radial data tracks to store user data. One interactive element 14 is provided for each of the first and second surfaces 16 and 18 of each of the discs 12a-d such that data can be read from or written to the data tracks of all of the storage discs 12. The heads 14 are coupled to a read/write control 40 (shown schematically in FIG. 2). It should be understood that the disc drive 10 is merely representative of a disc drive system utilizing the present invention and that the present invention can be implemented in a disc drive system including more or fewer storage discs.

The storage discs 12 are mounted for rotation by a spindle motor arrangement 22. In addition, each of the read/write heads 14a-h is supported by a respective actuator arm 24a-h for controlled positioning over preselected radii of the storage discs 12 to enable the reading and writing of data from and to the radial data tracks. In this example, the actuator arms 24a-h are rotatably mounted on a pin 26 by a voice coil motor 28 operable to controllably rotate the actuator arms 24a-h radially across the disc surfaces.

Figure 2:
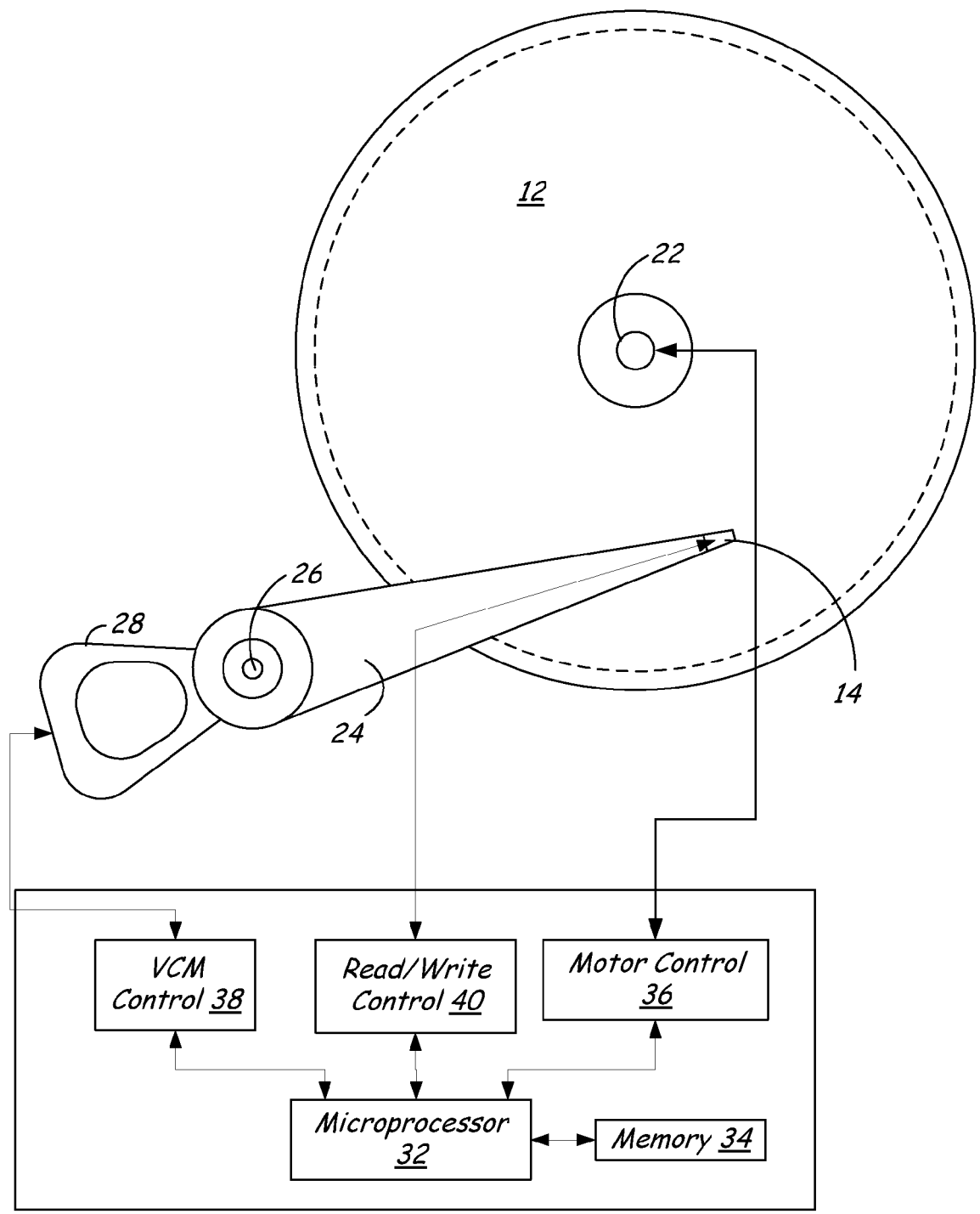
FIG. 2 is a schematic diagram illustrating a controller for use with the disc drive system of FIG. 1 according to one exemplary embodiment.

Referring now to FIG. 2, there is illustrated in schematic form a top view of the disc drive system 10 illustrating a control system 30 in communication with various components of the disc drive system. The controller system 30, in one illustrative embodiment, includes a microprocessor 32 coupled to a memory 34. Memory 34 can include random access memory, read only memory, or any other type memory that the microprocessor 32 accesses to execute instructions to control the position of the actuator arms 24a-h. Details of positional control of the actuator arms 24a-h will be discussed in more detail below.

Microprocessor 32 is coupled to a motor control 36, which provides a signal to the spindle motor arrangement 22 to control the rotational movement of the storage discs 12. In addition, the microprocessor 32 is coupled to a voice control motor control 38. The VCM control 38 provides a signal to the voice control motor 28 to cause the voice control motor 28 to rotate the actuator arms 24. Further, the microprocessor 32 is in electrical communication an interactive element read/write control 40, which receives and send signals to and from the interactive elements 14. The signals received and sent between the interactive read/write control 40 and the interactive elements 14 are associated with reading data from and/or writing data to the storage discs 12.

When data to be written or read from one of the storage discs 12a-d are stored on a data track different from the current radial position of the read/write interactive elements 14a-h, the microprocessor 32 determines the current radial position of the read/write interactive elements 14a-h and the radial position of the data track where the read/write interactive elements 14a-h are to be relocated. The microprocessor 32 then implements a routine that provides signals via the VCM control 38 to the voice coil motor 28 to cause the actuator arms 24 to move to a proper location. The routine, as will be discussed in more detail below, includes several different stages. As the actuator arms 24 are moved closer to the proper location, the routine provided by the microprocessor 32 passes through several stages. During each of the stages, the control signal sent via the VCM control is calculated using various different algorithms or controllers based on the stage that the microprocessor 32 is using to move the actuator arms 24.

Figure 3:
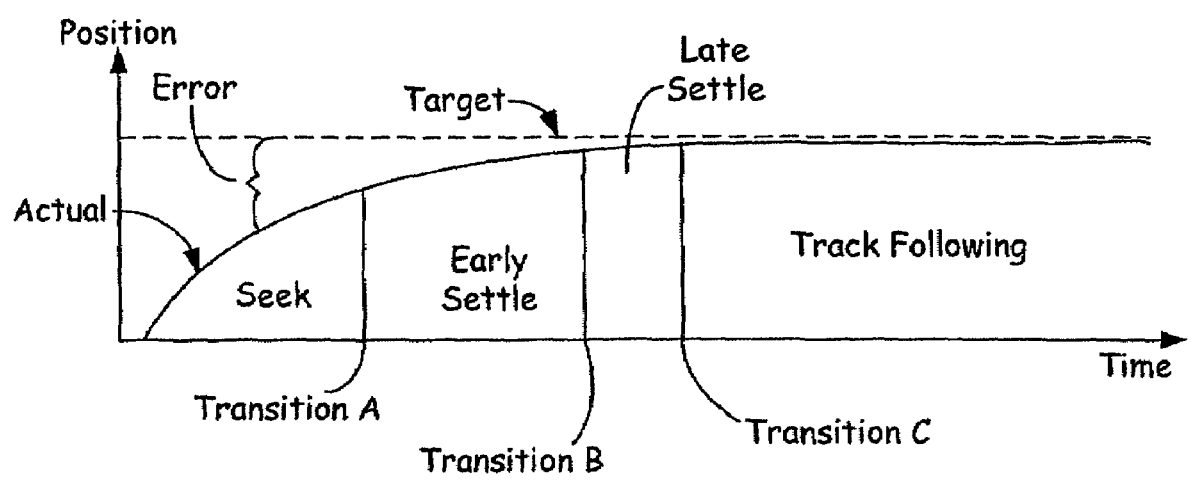
FIG. 3 is a schematic diagram illustrating a plurality of stages employed during positional control of actuators in the disc drive system of FIG. 1 according to one exemplary embodiment.

FIG. 3 is a diagram illustrating the different stages of a move of the actuator arms 24 from one position to another according to one illustrative embodiment. FIG. 3 details the position of the actuator 24 over time, where time is the time elapsed since the beginning of the movement of actuator 24. An intended position or target is indicated by a dotted line. As time elapses, the actual position of the actuator 24 is shown as approaching the target position. The difference between the target position and the actual position is a position error. A series of vertical lines divides the elapsed time into a series of stages. The first stage is a seek stage. During the seek stage, the controller employed by the microprocessor 32 includes a non-linear controller. The non-linear controller employed in the seek stage has, as a primary consideration, the movement of the actuator arm to the desired position as quickly as possible. The second stage is an early settle stage, which can also be known simply as the settle stage. The third stage is a late settle stage. The final stage is a track following stage, in which the actuator 24 is in proper position and "follows" the track by maintaining its position to the storage disc 12 as it rotates about the pin 26.

Each of the vertical lines in FIG. 3 not only provides a demarcation between two stages, but also represents a transition from one stage to the next. Thus, Transition A, illustrated in FIG. 3, represents the transition between the seek stage and the early settle stage. Similarly, Transition B represents the transition between the early settle stage and the late settle stage and Transition C represents the transition between the late settle and the track following stage. The transitions between one stage and the next are advantageously made to be smooth to avoid transients between the different controllers employed during each of the aforementioned stages. Details of the transitions will be discussed in more detail below.

Figure 4:
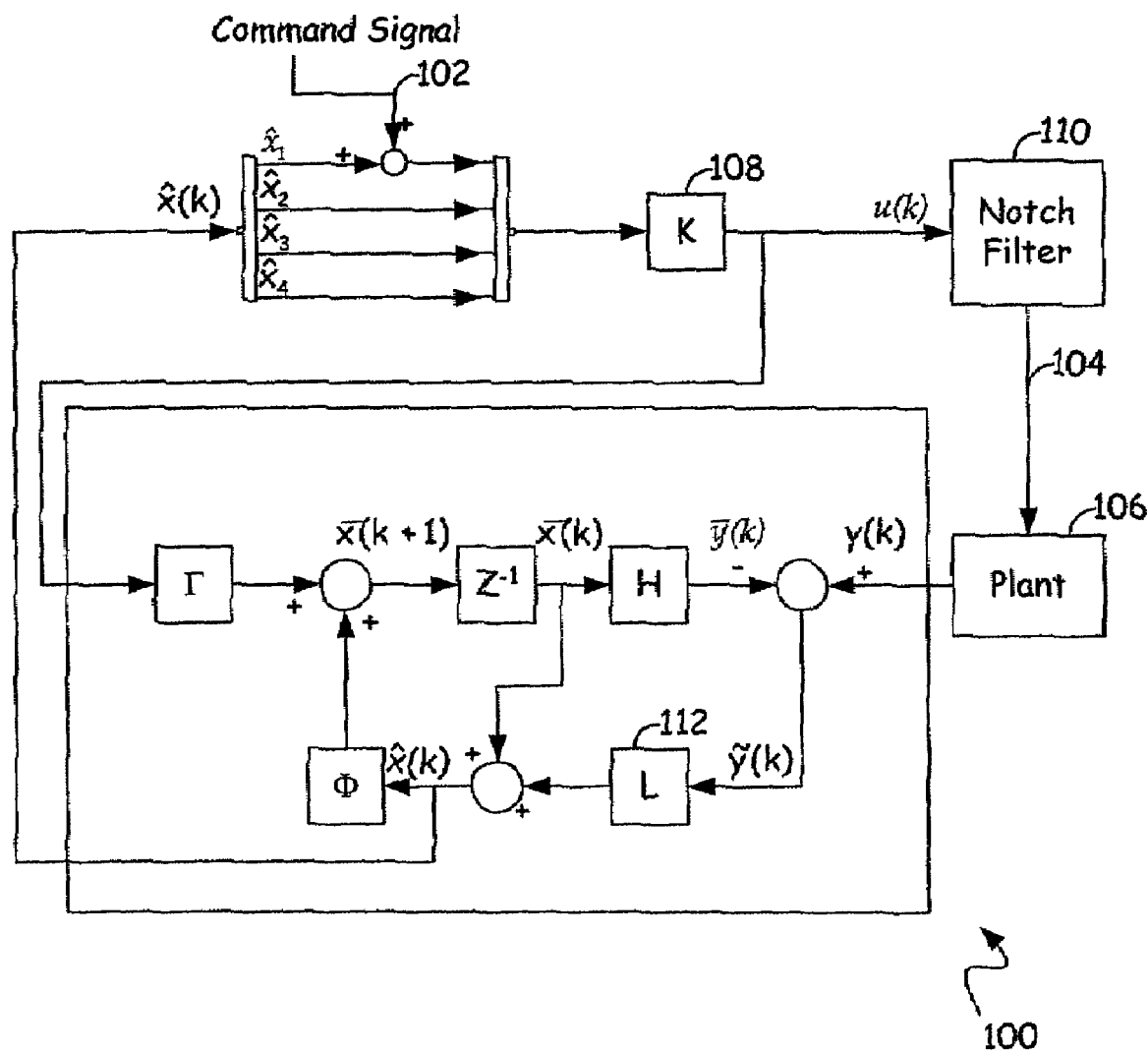
FIG. 4 is a schematic diagram illustrating an estimator compensator controller capable of providing signals to position actuators relative to storage discs in the disc drive system of FIG. 1 according to one exemplary embodiment.

FIG. 4 is a diagram of an estimator-compensator controller 100, which, in one illustrative embodiment, is employed in the early settle, which is also known as the settle stage. A command signal 102 is provided to the controller 100 and an output signal 104 is provided to plant 106 to control the position of the actuator 24. The command signal 102 is illustratively indicative of a desired signal to provide to the actuator 24 to move the actuator 24 to the target position as illustrated in FIG. 3. The plant 106, in one embodiment, includes the VCM control 38. The plant 106 provides a feedback signal, y(k), which provides an actual position of the actuator 24, or more particularly, the position of the interactive elements 14 relative to the storage discs 12.

The estimator-compensator controller 100 illustratively includes a controller gain K, shown in block 108, which receives signals $\hat{x}(k)$ and the control signal 102. The output $\hat{x}(k)$ from the estimator is used to generate the control output. The output u(k) is then filtered by notch filter 110 and provided to plant 106.

The estimator-compensator controller 100 also illustratively includes a estimator gain, L, represented by block 112. The estimator gain L receives a signal $\tilde{y}(k)$, which is an estimator error of the actuator 24. The estimator gain L applies a gain to the estimator error $\tilde{y}(k)$, and is subsequently summed with $\overline{x}(k)$ to provide $\hat{x}(k)$, which is an estimate of the states.

The estimator-compensator controller 100 includes four states. A first state, represented by $x_1$, indicates the head (or interactive element) position. A second state, represented by $x_2$, indicates the head velocity. A third state, represented by $x_3$, indicates a bias term, and a fourth state, represented by $x_4$, represents the current in the voice coil motor 28. Given that $x_2$, represents the velocity of the head, the head acceleration can be defined as:

$$\dot{x}_2 = \frac{K_t r_{VCM}}{J_{VCM}} x_4 + x_3$$

where $K_t$ is a torque constant for the voice coil motor 28, $r_{VCM}$ is the length of the actuator arm from the pin 26 to the interactive element 14 and $J_{VCM}$ is the moment of inertia about the z-axis for the actuator arm 24.

The signal provided to the plant 106 is defined as:

$$\frac{i_{VCM}}{u} = \frac{1}{\tau_v s + 1}$$

where u is the command current, $i_{VCM}$ is the voice coil motor current and $\tau_v$ is a time constant for the VCM control. Putting these equations into state-space form yields the following matrix equations:

$$\dot{x} = Ax + Bu$$

$$y = Cx + Du$$

where y is an output position and $$A = \begin{bmatrix} 0 & 1 & 0 & 0 \\ 0 & 0 & 1 & \frac{K_t r_{VCM}}{J_{VCM}} \\ 0 & 0 & 0 & 0 \\ 0 & 0 & 0 & -\frac{1}{\tau_v} \end{bmatrix},$$

-continued $$B = \begin{bmatrix} 0 \\ 0 \\ 0 \\ \frac{1}{\tau_v} \end{bmatrix},$$

$$C = [1 \quad 0 \quad 0 \quad 0],$$

$$D = 0.$$

Below, a continuous time domain model is converted to discrete time using a zero order hold equivalent. Assuming no input delay, the relevant equations for $\Phi$ and $\Gamma$ in a continuous time matrix (as shown in FIG. 4) are:

$$x(k+1) = \Phi x(k) + \Gamma u(k)$$

$$y(k) = Hx(k) + Du(k)$$

where $$H = [1 \quad 0 \quad 0 \quad 0]$$

$$D = 0$$

$$\Phi = e^{AT} = \sum_{n=0}^{\infty} \frac{A^n T^n}{n!}$$

$$\Gamma = \int_0^\infty e^{A\eta} d\eta B$$

and where T is the sample time in seconds and $\eta = kT + T$, where k is a particular sample.

The estimator calculates an estimate of the states for the current control cycle, $\hat{x}(k)$, based on measurements of the plant output form the current control cycle, y(k). The closed loop current estimator equations are:

$$\hat{x}(k) = \overline{x}(k) + L\tilde{y}(k)$$

where $$\tilde{y}(k) = y(k) - H\overline{x}(k)$$

$$\overline{x}(k) = \Phi x(k-1) + \Gamma u(k-1)$$

To calculate the transfer function of the compensator, the state-space representation of the controller and current estimator are assembled. The current estimator is given by:

$$\hat{x}(k) = \overline{x}(k) + L[y(k) - H\overline{x}(k)]$$

which can be written as $$\hat{x}(k) = [I - LH]\overline{x}(k) + Ly(k)$$

and $$\overline{x}(k+1) = \Phi \overline{x}(k) + \Gamma u(k).$$

As discussed above, $u(k) = -K\hat{x}(k)$. Thus, the transfer function of the compensator in state space form can be written as $$\overline{x}(k+1) = A_{COMP}\overline{x}(k) + B_{COMP}y(k)$$

$$u(k) = C_{COMP}\overline{x}(k) + D_{COMP}y(k)$$

where $$A_{COMP} = [\Phi - \Gamma K][I - LH]$$

$$B_{COMP}=[\Phi-\Gamma K]L$$

$$C_{COMP}=K[I-LH]$$

$$D_{COMP}=KL.$$

Figure 5:
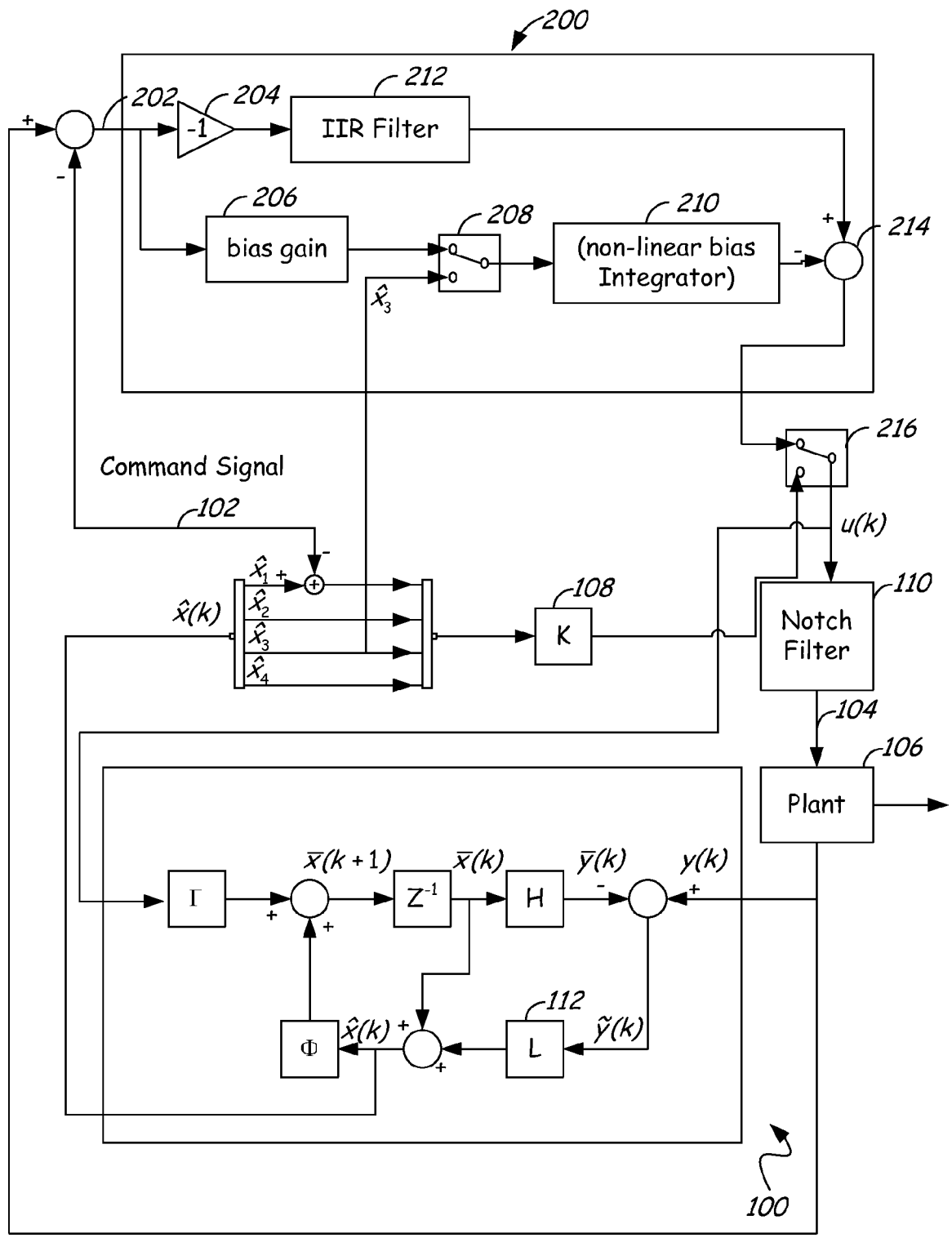
FIG. 5 is a schematic diagram illustrating the estimator compensator controller of FIG. 4 coupled to a controller including an infinite impulse response filter in parallel with an integrator according to one exemplary embodiment.

FIG. 5 illustrates a diagram of an estimator-compensator controller 100 combined with a controller 200 incorporating an infinite impulse response (IIR) filter in parallel. The controller 200 receives as an input a position error signal 202, which represents the difference between the actual position of the actuator, provided by the plant 106 and the commanded position signal 102. This position error signal 202 is shown diagrammatically in FIG. 3. The position error signal 202 is provided to a gain element 204, which provides a gain of −1, for example, to the position error signal 202. The position error signal 202 is also supplied to a bias gain, represented by block 206. The output of the bias gain is provided to a selector 208. The selector 208 selects between output of the bias gain and an input $\hat{x}_3$, which is the bias estimate from the estimator compensator controller 100. The input chosen by the selector 208 is provided to the non-linear bias integrator 210. The bias gain 206 provides low frequency gain for the integrator and effects the drive of the steady state error to zero.

The output of the gain element 204 is provided to an IIR filter 212. In one embodiment, the IIR filter illustratively includes at least an eighth order filter, although it should be appreciated that lower order filters can be utilized. The output of the IIR filter 212 is summed with the negative of the output of the integrator 210 to provide for a summation 214. The summation 214 is then provided to a selector 216. If the selector 216 select the summation 214, the summation is provided to notch filter 110, which, in one embodiment, includes at least an eighth order filter. Otherwise, the notch filter receives, as an input, the output from block 108, as described above.

The IIR filter 212, as described above, is illustratively an eighth order filter. Thus, the filter constants can be employed to shape the desired response utilizing the controller 200 at various stages such as during late settle and track following without any constraints from the estimator-compensator controller 100. In one embodiment, the filter constants are simply coefficients of matrix equations, which result in a simpler controller than that described above with respect to the estimator-compensator controller.

Figure 6:
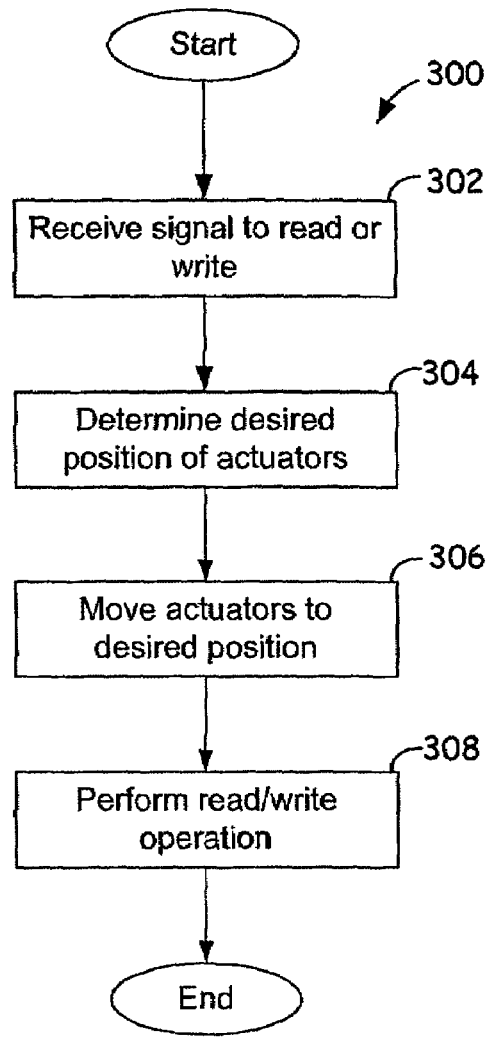
FIG. 6 is a flowchart detailing a method of controlling an actuator to position the actuator to read data from and/or write data to a data storage disc according to one exemplary embodiment.

FIG. 6 illustrates a block diagram of a method 300 of controlling an actuator using a multiple controller architecture of the type described above. At block 302, the controller receives a signal indicating that a location on a storage disc 12 is to be read from or written to. The location at which the read/write operation is to take place is designated as the target location (as shown in FIG. 3). Next, the actual position of the actuators 24 is determined, as represented by block 304. In one illustrative embodiment, the interface element 14 provides a signal to the microprocessor 32 through the read/write control 40 indicating the actual location. Then, the actuators 24 are moved to the desired or target position, as represented by block 306. Once the actuators 24 have been moved to a proper position, data is either read from or written to the storage disc 12.

Figure 7:
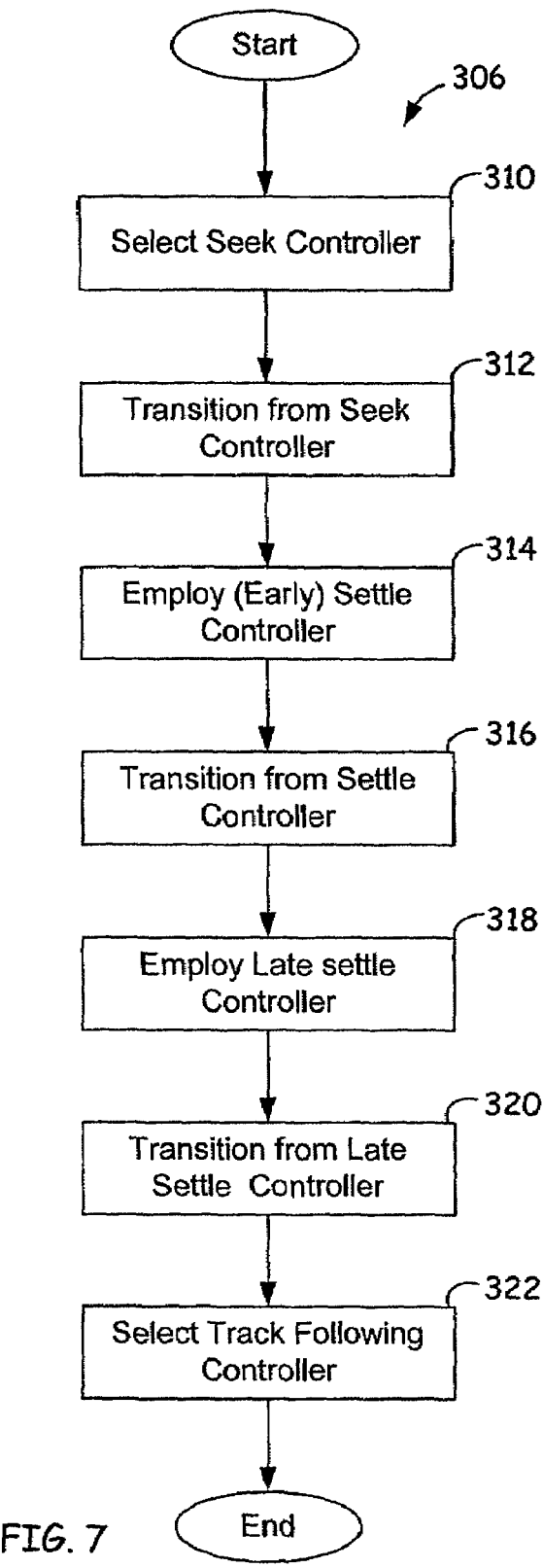
FIG. 7 is a flowchart illustrating the method of FIG. 6 of positioning an actuator in more detail.

FIG. 7 illustrates step 306 in more detail according to one illustrative embodiment. In block 310, the controller 32 selects the seek controller. As discussed above, the seek controller is illustratively a non-linear controller that is configured to provide rapid, relatively large-scale movements. Referring to FIG. 3, when the error, that is, the difference between the target and actual actuator positions is small enough, the controller 32 transitions from the seek controller, as is represented by block 312. This occurs as the control algorithm transfers from the seek stage to the settle or early settle stage. During the transition, the non-linear seek controller is prepared to hand off control to the estimator-compensator control 100. In one illustrative embodiment, the estimator-compensator control 100 is aligned so that it is in the same phase plane established by the seek controller to provide a smooth transition, without generating transients.

Once the transition is accomplished between the seek controller and the early settle controller, the positioning of the actuator is controlled by the early settle controller, as indicated in block 314. As discussed above, the early settle controller includes, in the illustrative embodiment, the estimator-compensator control 100 discussed above. As the actuator 24 moves closer to the target location, it approaches a transition between the early settle or settle stage and the late settle stage. At that point a transition from the settle controller occurs, as is demonstrated at block 316.

In one illustrative embodiment, the transition from the early settle controller to the late settle controller is accomplished by transitioning from the estimator compensator controller 100 to the controller 200. The transition is illustratively accomplished by providing an input error signal 202 to the controller 200, so that the IIR filter is charged prior to a transition from the early to late settle controller. At this point, selector 216 is configured to provide the output from block 108 to notch filter 110. When the transition is about to occur, the selector 208 is momentarily switched to allow $\hat{x}_3$ to be selected as a bias input to the integrator 210. Once, the integrator has been provided with a signal from $\hat{x}_3$, the selector 208 is illustratively chosen to select the bias gain 206. Introduction of the $\hat{x}_3$ signal serves to initialize controller 200. Once the transition to controller 200 is complete, the late settle controller is employed, which is designate by block 318.

When the actuator 24 has approached the target location, the late settle controller transitions toward the track following controller. This is represented by block 320. In the illustrative embodiment, the track following controller utilizes the same structure as that of the late settle controller. Thus, the transition between the late settle controller and the track following controller involves arranging the controller coefficients described above with respect to controller 200. During the transition between the late settle controller and the track following controller, the IIR states are carried over and the integrator state, in one illustrative embodiment, is once again initialized by momentarily changing selector 208 to allow a signal from $\hat{x}_3$ to be provided to the integrator 210. Once the transition has been completed, the track following controller is employed for the duration of the read/write cycle. This is represented by block 322. The track following controller is primarily involved with handling disturbance rejection.

One or more of the embodiments discussed above may provide important advantages. The use of an estimator-compensator controller may allow for a smooth transition between seek and settle stages. In addition, the use of an estimator-compensator controller in the early settle stage, when the difference (or error) between the actual and desired location is still relatively large may avoid windup problems that can be encountered when using an integrator with a relatively large initial error.

By employing an IIR controller with an integrator in parallel for the late settle and track following stage, a number of advantages can be realized. First of all, because the IIR controller structure is distinct from the estimator-compensator controller structure, it is not constrained by the estimator-compensator controller. In addition, the seek controller is not constrained by either of the IIR controller or the estimator-compensator controller. Further, the IIR controller allows for loop-shaping, which is well suited to deal with disturbance rejection issues. In addition, more capability exists to shape in the amplification region of the error function to reduce tracking error in the track following stage. Further still, the architecture is flexible enough to notch the sensitivity function at given frequencies to reduce post seek oscillation.

It is to be understood that even though numerous characteristics and advantages of the various embodiments have been set forth in the foregoing description, together with details of the structure and function of various embodiments, this disclosure is illustrative only, and changes may be made in detail, especially in matters of structure and arrangement of parts within the principles of the present embodiments to the full extent indicated by the broad general meaning of the terms in which the appended claims are expressed. For example, the particular elements may vary depending on the particular application for the controller while maintaining substantially the same functionality without departing from the scope and spirit of the present embodiments. In addition, although an embodiment described herein is directed to position of a head array in a data storage system, it will be appreciated by those skilled in the art that the teachings of the present embodiments can be applied to other systems that utilize actuator positioning, without departing from the scope and spirit of the present embodiments.

What is claimed is:

1. A method, comprising:
   selecting an actuator controller for an actuator, including:
      responsive to the actuator being in a settle stage, selecting a first controller having an estimator-compensator architecture;
      responsive to the actuator being in a track follow stage, selecting a second controller having an architecture including an infinite impulse response filter having an integrator in parallel; and
   providing a control output, which is indicative of a control signal, from the selected controller to the actuator.

2. The method of claim 1 wherein the settle stage includes an early settle stage and a late settle stage and wherein step of selecting the controller further comprises:
   responsive to the actuator being in the early settle stage, selecting the first controller; and
   responsive to the actuator being in the late settle stage, selecting the second controller.

3. The method of claim 1 and further comprising:
   providing a transition from the first controller to the second controller.

4. The method of claim 3, wherein the step of providing the transition from the first controller to the second controller comprises:
   prior to selecting the second controller, receiving the control signal at the second controller and a bias term provided by the first controller to initialize the second controller.

5. The method of claim 4, wherein the step of selecting the second controller includes:
   terminating the reception of the bias term provided by the first controller after the second controller has been initialized.

6. The method of claim 1, wherein the step of selecting the controller further comprises:
   responsive to the actuator being in a seek stage, selecting a third controller having an architecture other than that of either of the first and second controllers.

7. The method of claim 6, wherein the step of selecting the controller further comprises:
   responsive to the actuator transitioning from the seek stage to the settle stage, providing a transition between the third controller and the first controller, including aligning the first controller with a phase plane established by the third controller.

8. A method, comprising:
   providing an output signal from a first controller to an actuator in a settle state, the first controller having an estimator-compensator architecture;
   receiving a control signal indicative of a desired position of the actuator and a feedback signal indicative of an actual position of the actuator; and
   responsive to the control signal and the feedback signal, transitioning, from the first controller to a second controller having an architecture other than the estimator-compensator architecture so that the output signal is provided by the second controller.

9. The method of claim 8, wherein the step of transitioning from the first controller to the second controller comprises:
   providing the control signal to the second controller for a period of time while providing the output signal from the first controller.

10. The method of claim 8, wherein the second controller includes an integrator and wherein the step of transitioning from the first controller to the second controller comprises:
    providing a momentary biasing signal from the first controller to the integrator.

11. The method of claim 8, and further comprising:
    responsive to the control signal and the feedback signal, transitioning, based upon a difference between the desired position and the actual position of the actuator from the second controller to a third controller having an architecture other than an estimator-compensator architecture.

12. The method of claim 11, wherein the architectures of the second and third controllers each include a multi-stage infinite impulse filter and wherein the transition between the second controller and the third controller comprises:
    matching gains between the second controller and the third controller.

13. The method of claim 8, and further comprising:
    providing an output signal from a non-linear controller to an actuator;
    receiving a control signal indicative of a desired position of the actuator and a feedback signal indicative of an actual position of the actuator in response to the output signal provided to the non-linear controller; and
    transitioning, based upon a difference between the desired position and the actual position of the actuator from the non-linear controller to the first controller.

14. An apparatus, comprising:
    an actuator; and
    an actuator controller operably coupled to the actuator with a controller architecture including:
       a first settle controller having an estimator-compensator architecture; and
       a second settle controller having an architecture other than an estimator-compensator;
       wherein the actuator controller selects one of the first and second settle controllers to provide an output to the actuator as indicated by a control signal indicative of a desired position of the actuator and a feedback signal indicative of an actual position of the actuator.

15. The apparatus of claim 14, wherein the second settle controller includes an infinite impulse response (IIR) filter and an integrator in parallel with the IIR filter.

16. The apparatus of claim 15, wherein IIR filter of the second settle controller comprises at least an eighth order filter.

17. The apparatus of claim 14, wherein the second settle controller is in communication with the first settle controller so that it receives an initializing input from the first settle controller that is indicative of a bias estimator of the first settle controller.

18. The apparatus of claim 14, wherein the second settle controller functions independently of the first settle controller.

19. The apparatus of claim 14, wherein the controller architecture further comprises:

a third controller, wherein the first and second settle controllers are linear controllers and the third controller is a non-linear controller.

* * * * *